United States Patent Office 2,720,479
Patented Oct. 11, 1955

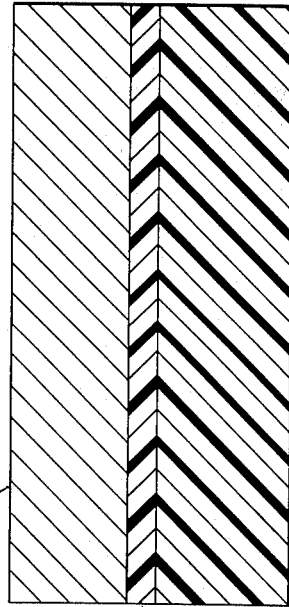

2,720,479

METHOD OF BONDING USING BROMINATED ISO-MONOOLEFIN POLYOLEFIN INTERPOLYMER ADHESIVE COMPOSITIONS AND ARTICLE PRODUCED THEREBY

Richard A. Crawford, Akron, and Richard T. Morrissey, Cuyahoga Falls, Ohio, assignors to The B. F. Goodrich Company, New York, N. Y., a corporation of New York Application June 30, 1951, Serial No. 234,678

13 Claims. (Cl. 154—130)

This invention relates to an adhesive and method of preparing the same and to the composite products made with such adhesive, and pertains more specifically to an adhesive comprising a brominated rubbery isoolefin-polyolefin interpolymer.

Adhering Butyl-type rubbery interpolymers to crude rubber or to other materials has in the past presented a problem of such magnitude that the widespread use of such interpolymers has been curtailed except in special applications.

It is an object of this invention to provide an improved adhesive which is suitable for adhering rubbery materials including rubbery isoolefin-polyolefin interpolymers to other materials.

It is also an object to provide such an adhesive for adhering a rubbery isoolefin-polyolefin interpolymer to crude rubber or natural rubber compositions.

It is a further object to provide an adhesive for adhering rubbery materials, particularly rubbery isoolefin-polyolefin interpolymers to other materials such as metal, wood, plastic, fabric and the like.

It is also an object to provide methods of using such adhesives.

Other objects will be apparent from the description which follows.

It has been discovered that a dispersion of bromine-containing derivatives of isoolefin-polyolefin interpolymers and particularly rubbery derivatives of such interpolymers in a suitable solvent such as n-heptane is very satisfactory as an adhesive for adhering isoolefin-diolefin interpolymers to crude and synthetic rubber and to metal, wood, concrete, plastics, fabric and other materials. It has been most difficult in the past to adhere these so-called "Butyl" interpolymers to other materials; however, these interpolymers may be strongly adhered to other materials by using an adhesive containing a derivative of these interpolymers, the derivative being prepared as described in the following paragraphs.

The isoolefin-polyolefin interpolymers referred to are those comprising a major proportion of an isoolefin such as isobutylene and a minor proportion of one or more polyolefins (i. e., diolefins, triolefins, or other olefins containing more than one double bond), which interpolymers are characterized by high molecular weight, low unsaturation and low reactivity with sulfur to give an elastic product. Such interpolymers have been described in U. S. Patents 2,322,073; 2,356,128; 2,356,129; 2,356,130; 2,373,706; 2,384,975 and 2,418,912 and are commonly known as "Butyl" or GR–I–50, GR–I–15, GR–I–17, GR–I–18, these interpolymers being of the type comprising a major proportion of isobutylene and a minor proportion of isoprene.

The isoolefin-polyolefin interpolymers used in preparing brominated derivatives are the solid plastic rubbery interpolymers described in the above-listed patents, examples being interpolymers of a major proportion, desirably from 70 to 99% by weight, of an isoolefin containing from 4 to 8 carbon atoms such as isobutylene, 3-methyl butene-1, 4-methyl pentene-1, 2-ethyl butene-1, 4-ethyl pentene-1 or the like, or a mixture of such isoolefins with a minor proportion, desirably from 1 to 30% by weight, of a polyolefin generally containing from 4 to 18 carbon atoms, or two, three or more such polyolefins including the following: (1) acyclic or open-chain conjugated diolefins such as butadiene-1,3, isoprene, 2,4-dimethyl butadiene-1,3, piperylene, 3-methyl pentadiene-1,3, hexadiene-2,4, 2-neopentyl-butadiene-1,3, and the like; (2) acyclic non-conjugated diolefins such as dimethallyl and its homologs containing 2 to 6 carbon atoms interposed between two isopropenyl radicals, 2-methyl hexadiene-1,5, 2-methyl pentadiene-1,4, 2-methyl heptadiene-1,6, 2-methyl heptadiene-1,4 and other tertiary non-conjugated diolefins having one double bond in the terminal position attached to a tertiary carbon atom; (3) alicyclic diolefins, both conjugated and non-conjugated, such as cyclo-pentadiene, cyclohexadiene, 1-vinyl cyclohexene-3, 1-vinyl cyclohexene-1, 1-vinyl cyclopentene-1, 1-vinyl cyclobutene-2, dicyclopentadiene and the like as well as monocyclic diolefinic terpenes such as dipentene, terpinenes, terpinolene, phellandrines, sylvestrene and the like; (4) acyclic triolefins such as 2,6-dimethyl-4-methylene-heptadiene-2,5, 2-methyl hexadiene-1,3,5 and other conjugated triolefins, as well as myrcene, ocimene, allo-ocimene and the like; (5) alicyclic triolefins such as fulvene, 6,6-dimethyl fulvene, 6,6-methyl ethyl fulvene, 6-ethyl fulvene, 6,6-diphenyl fulvene, 6-phenyl fulvene and other fulvenes of the formula

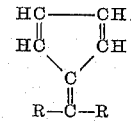

wherein each R is hydrogen, alkyl, cycloalkyl or aryl; as well as other alicyclic triolefins such as 1,3,3-trimethyl-6-vinyl-cyclohexadiene-2,4, cycloheptatriene, etc.; and (6) higher polyolefins such as 6,6-vinyl methyl fulvene (a tetraolefin) and 6,6-diisopropenyl fulvene (a penta olefin).

The preferred solid, plastic, rubbery interpolymers are generally prepared by low temperature (from 0° C. to −165° C.) interpolymerization using an appropriate catalyst such as an active metal halide or Friedel-Crafts type catalyst (aluminum chloride or boron trifluoride) dissolved in a low freezing solvent such as methyl or ethyl chloride. These interpolymers generally have an average molecular weight above 15,000, iodine numbers of from 0.5 to 50, and they are reactive with sulfur to form elastic products.

Isoolefin-polyolefin interpolymers containing other additional monomers such as styrene, chlorostyrenes, acrylyl chloride, methallyl chloride, and other mono-olefinic monomers may also be used instead of a true copolymer of isoolefin and polyolefin alone. An interpolymer produced from a monomer system comprising 50% isobutylene, 30% styrene and 20% isoprene may be used.

The bromination of such interpolymers may be carried out by any suitable process which gives a product having from 0.5% to 20% by weight or even as much as 50% by weight of combined bromine depending on the degree of unsaturation, which in turn depends upon the proportion of polyolefin in the interpolymer used. The preferred derivatives are not completely saturated but are less unsaturated than the parent unbrominated interpolymers. In the preferred derivatives, the percentage of combined bromine is from 20 to 80% of the amount which would be present if all olefinic double bonds (>C=C< units) were completely brominated to give

Generally, the preferred percentage of combined bromine is from about 1.5 to 6% by weight in interpolymers containing from 95 to 98% isoolefin and from 2 to 5% diolefin.

Some of the bromination methods which may be used are (1) passing gaseous bromine over finely-divided solid isoolefin-polyolefin interpolymer, (2) adding a solid brominating agent such as N-bromosuccinimide to the interpolymer on a mixing mill, or (3) preparing a solution, a dispersion or cement of the interpolymer in a suitable liquid organic solvent and adding the brominating agent either as such or in solution to the interpolmer solution to form the brominated interpolymer in solution or dispersion in the solvent, which final solution is admixed with a non-solvent for the brominated derivative to precipitate the latter.

The single figure of the drawing is an elevational view in section of a laminate embodying this invention.

The preparation of the brominated derivative and an adhesive cement of the brominated derivative is illustrated by the following example. In the example, all parts are by weight.

EXAMPLE 1

A solid plastic rubbery interpolymer of about 97% isobutylene and about 3% isoprene known as "Butyl" is dissolved in liquid ethyl chloride to form a 20% solution containing 100 parts of interpolymer. A solution containing 5 to 16 parts of bromine dissolved in ethyl chloride is added to the interpolymer solution at 0° C. in a closed vessel and the resulting mixture stirred for five minutes at which point an excess of alcoholic potassium hydroxide is added to neutralize the unreacted bromine. The mixture is stirred for several minutes and an aqueous slurry of finely-divided calcium silicate (2.5% based on the weight of brominated interpolymer), which serves as a stabilizer for the brominated interpolmer, is added and the mixture stirred rapidly. The homogeneous mixture is discharged from the reaction vessel in a fine stream into a closed coagulating tank fitted with a condenser, the tank containing hot water (60° to 70° C.) and a colloidal dispersion of calcium silicate, whereupon the ethyl chloride is flashed off and recovered in the condenser and the brominated interpolymer is obtained as a fine crumb-like coagulum containing intimately dispersed calcium silicate. The coagulum is separated by filtering, washed with clear water, and dried.

The calcium silicate stabilized brominated isobutylene-isoprene interpolymer composition obtained contains from 1.5 to 5.0% or more of combined bromine depending on the original amount of bromine used and from 2.5 to 3.0% by weight of calcium silicate.

One hundred parts of this brominated isobutylene-isoprene interpolymer composition is mixed on a conventional rubber mill with forty parts of easy-processing channel black and this mixture is then dissolved in a suitable solvent to form a cement. An excellent cement is formed by dissolving fourteen parts of this composition in eighty-six parts of n-heptane.

The adhesive is used as follows in adhering an isobutylene-isoprene interpolymer to a natural rubber composition such as a tire carcass composition. The adhesive cement is spread upon the faces of the isobutylene-isoprene interpolymer and natural rubber sheets to be joined and the cement allowed to dry. The cemented surfaces are pressed together and the assembly is vulcanized. Any tests conducted to determine the strength of the bond between the rubber layers result in a failure within the rubber layers themselves before any breakdown in the adhesive bond takes place.

EXAMPLE 2

A cement is prepared by dispersing 100 parts by weight of a 97:3 isobutylene-isoprene interpolymer and 40 parts of carbon black in n-heptane to obtain a 10% cement. A 10% bromine solution in carbon tetrachloride is added thereto until a cement having about 9% bromine content based on the rubbery hydrocarbon is provided.

A rubber composition is prepared according to the following recipe:

| Material: | Parts by weight |
|---|---|
| Isobutylene-isoprene interpolymer | 100.00 |
| Carbon black | 60.0 |
| Petrolatum | 1.5 |
| Zinc oxide | 15.0 |
| Sulfur | 2.0 |
| Phenolaldehyde resin | 1.5 |
| P-quinone dioxime | 2.0 |
| 2,2'-benzothiazyl disulfide | 4.0 |
| Total | 186.0 |

The adhesive is then used in adhering the isobutylene-isoprene interpolymer rubber composition defined in the above recipe to various metals and adhesion tests conducted as follows: A flat piece of the metal to be tested is coated with a suitable primer such as a resorcinol-formaldehyde resin solution having a curing agent such as hexamethylene tetramine (Bostick T-30A and T-30B, B. & B. Chemical Company). The resin coat is dried and the metal and layer of isobutylene-isoprene interpolymer composition containing a vulcanizing agent are coated with the adhesive cement of this example. After the adhesive coating is dried, the metal and isobutylene-isoprene interpolymer layer are pressed together and the assembly subjected to a curing temperature of 292° F. for 30 minutes to vulcanize the isobutylene isoprene interpolymer composition and set the adhesive. The adhesion expressed in pounds per inch width between the metal and interpolymer layer is measured on the Cooey Autographic Adhesion Tester.

Adhesion results

| Metal | Adhesion (lbs./inch width) | |
|---|---|---|
| | Room Temp. | 212° F. |
| Copper | 100 | 78 |
| Brass | 100 | 86 |
| Steel | 100 | 87 |
| Aluminum | 100 | 100 |
| Stainless Steel | 100 | 100 |
| Dow metal | 100 | 100 |

These results indicate the excellent adhesion achieved between metal and "Butyl rubber" by using the adhesives of this invention. The upper limit of the range for the ester is 100 lbs. The only results lower than 100 lbs. per inch width are obtained when the isobutylene-isoprene interpolymer layer fails when tested at elevated temperatures. No bond failures are evident in these tests.

A very good adhesive may be provided as follows:

EXAMPLE 3

The stabilized brominated isobutylene-isoprene interpolymer of Example 1 is mixed on a rubber mill along with other ingredients according to the following recipe:

| Materials: | Parts by weight |
|---|---|
| Brominated interpolymer | 100.0 |
| Carbon black | 40.0 |
| Phenolformaldehyde resin | 60.0 |
| Hexamethylene tetramine | 7.6 |
| Total | 207.6 |

This composition is used to make a 10% cement by dispersing 10.0 parts of the composition in 90.0 parts of n-heptane. The cement is then used to adhere an isobutylene-isoprene rubbery composition to steel. The rubbery composition which is to be adhered to steel is prepared according to the following recipe:

| Material: | Parts by weight |
| --- | --- |
| Isobutylene-isoprene interpolymer | 100.0 |
| Carbon black | 50.0 |
| Stearic acid | 2.0 |
| Zinc oxide | 5.0 |
| Sulfur | 2.0 |
| Mercaptobenzothiazole | 0.5 |
| Tetramethyl thiuram disulfide | 1.0 |
| Dinitroso benzene | 0.1 |
| Total | 160.6 |

A layer of cement is spread on both the rubbery composition and the steel. The cement is allowed to dry and the steel and rubbery composition pressed together and the assembly heated to set the adhesive and vulcanize the rubber composition layer. When the bond is tested, the rubbery composition itself fails before the bond between the rubbery composition and metal fails.

Likewise a crude rubber composition is adhered to metal with the cement of this example. The crude rubber composition is prepared according to the following recipe:

| Material: | Parts by weight |
| --- | --- |
| Crude rubber | 100.0 |
| Carbon black | 28.0 |
| Sulfur | 2.5 |
| Zinc oxide | 3.0 |
| Salicylic acid | 0.5 |
| Laurie acid | 0.3 |
| Paraffin base oil | 3.6 |
| Trimethyl-dihydroquinoline | 0.6 |
| Hexamethylene tetramine | 0.4 |
| Sodium acetate | 0.5 |
| Mercaptobenzothiazole | 0.1 |
| Heptylated diphenylamine | 0.8 |
| Total | 140.3 |

This rubber composition is adhered to steel as was the isobueylene-isoprene rubbery interpolyer composition above by spreading on the cement, pressing and curing. Again the rubbery composition comprising crude rubber fails before the bond fails, when the bond is tested.

It is not necessary to use a resin primer coat when using the adhesive cement of Example 3 for metal to rubber bonds because the resin is included in the cement itself.

Such a rubber, resin, carbon black composition may also be used in the form of a solid adhesive or tie gum.

Many variations can be made in the method of preparation and use of the adhesive cements of this invention.

The solvents used may include n-heptane, toluene, gasoline, benzene, or any other suitable solvent. The amount of solvent used with a given amount of brominated interpolymer may be varied widely depending upon the consistency in the product which may be desired. The cements may be flowed on, dipped on, or brushed as is desired. One or multiple coats may be applied, with or without intervening drying steps.

It has been found that the best adhesion results are obtained if carbon black is added to the adhesive cements of this invention; however, other materials may be added in addition to or in place of the carbon black. For instance, in light-colored compositions, calcium silicate or other suitable materials may be used as a reinforcing material or filler. The best results are obtained by adding the carbon black to the rubbery material before dispersing the composition in the solvent. This addition preferably is made by mixing the rubber and carbon black on a rubber mill, but the carbon black may be stirred into a dispersion of rubbery material in n-heptane or other solvent if desired. The proportion of carbon black or other like material which is added may vary widely, but is preferably from 10 to 80 parts by weight per 100 parts of brominated derivative.

When bonding a rubbery composition to an isobutylene-isoprene interpolymer it has been found advantageous to include in the cement to be used, a minor proportion (up to 30%) of the rubbery composition to be bonded. There is no advantage evident in adding such rubbery composition to the cement when adhering metal to rubber.

When adhering rubber to metal, the metal surface is generally sand-blasted or pickled or prepared in some like manner and then is precoated with a suitable primer such as a phenol-formaldehyde resin. A resorcinal-formaldehyde resin has been found to be a suitable primer to be applied before application of the adhesive cement of this invention. The particular pretreatment of the metal is not critical; however, it is desirable that the metal surface be prepared by some suitable method.

In cements such as those of Example 3, the resin may be added in varying proportions of from 40 to 80 parts by weight per 100 parts of brominated derivative.

Of the many possible variations of this invention, one stands out, although it might appear obvious. A sheet of unbrominated isobutylene-isoprene interpolymer composition, the recipe of which appears in Example 3, may be adhered to a sheet of natural rubber by treating the surface of the interpolymer sheet with a solution of bromine to form a layer of brominated isobutylene-isoprene upon the surface of the sheet. This brominated derivative surface is then placed next to the natural rubber sheet which has been cleaned with a suitable solvent and the sheets pressed together and heated to vulcanize the rubber constituents. Likewise, a sheet of brominated isobutylene-isoprene interpolymer may be adhered to natural rubber by cleaning the surfaces and pressing the sheets together and vulcanizing. Another variation of the invention is to sheet out the stabilized brominated isobutylene-isoprene interpolymer composition of Example 1 instead of dissolving the composition in a solvent, and using the resulting sheeted material as a tie gum. The surfaces of the rubbery isobutylene-isoprene interpolymer layer and natural rubber layer are cleaned with a suitable solvent and a layer of the tie gum is interposed between these rubbery layers and the composite structure vulcanized. The layers of the resulting laminate are strongly adhered one to the other.

While certain specific embodiments of the invention have been herein disclosed, it is not intended that the invention be limited thereto, but it is intended to include all the obvious modifications and variations falling within the spirit and scope of the appended claims.

We claim:

1. An adhesive cement comprising a mixture of 100 parts by weight of a brominated, solid plastic, rubbery olefinically-unsaturated interpolymer of from 70 to 99% by weight of an isomonoolefin containing from 4 to 8 carbon atoms and from 1 to 30% by weight of a polyolefin containing from 4 to 18 carbon atoms, said interpolymer containing more than 0.5% bromine but less than enough to saturate all of its olefinic unsaturation, from 10 to 80 parts by weight of carbon black, from 40 to 80 parts by weight of phenol-formaldehyde resin and a volatile solvent for said interpolymer.

2. The method of bonding to metal a rubbery interpolymer of 70 to 99% by weight of an isomonoolefin containing from 4 to 8 carbon atoms with 1 to 30% by weight of a polyolefin containing from 4 to 18 carbon atoms, which method comprises assembling said interpolymer and said metal together with an interposed layer comprising a mixture of a phenol-aldehyde resin with a brominated solid, rubbery interpolymer of 70 to 99% by weight of an isomonoolefin containing from 4 to 8 carbon atoms with 1 to 30% by weight of a polyolefin containing from 4 to 18 carbon atoms, said brominated interpolymer containing bromine in an amount from 20 to 80% of that required to saturate all of its olefinic unsaturation, and heating said assembly under pressure to vulcanize said rubbery interpolymer.

3. An adhesive composition comprising a mixture of a solid rubbery brominated olefinically-unsaturated interpolymer of a major proportion of an isomonoolefin containing 4 to 8 carbon atoms with a minor proportion of a polyolefin containing 4 to 18 carbon atoms, said interpolymer containing a combined bromine content above 0.5% by weight but below that which corresponds to complete saturation of the olefinic double bonds, and a phenol-aldehyde resin.

4. An adhesive composition comprising a mixture of a solid rubbery brominated olefinically-unsaturated interpolymer of 70 to 99% by weight of an isomonoolefin containing 4 to 8 carbon atoms and 1 to 30% by weight of a polyolefin containing 4 to 18 carbon atoms, said interpolymer containing a combined bromine content above 0.5% by weight but below that which corresponds to complete saturation of the olefinic double bonds, and a phenol-formaldehyde resin.

5. An adhesive composition comprising a mixture of a solid rubbery brominated olefinically-unsaturated interpolymer of a major proportion of isobutylene with a minor proportion of isoprene, said interpolymer containing a combined bromine content above 0.5% by weight but below that which corresponds to complete saturation of the olefinic double bonds, and a resorcinol-formaldehyde resin.

6. An adhesive composition comprising a mixture of a solid rubbery brominated interpolymer of 70 to 99% by weight of an isomonoolefin containing 4 to 8 carbon atoms and 1 to 30% by weight of a polyolefin containing 4 to 18 carbon atoms, said interpolymer being brominated to such an extent that it contains combined bromine in an amount from 20 to 80% of that required to saturate all of its olefinic double bonds, a phenol-formaldehyde resin, and a volatile solvent for said interpolymer.

7. An adhesive cement comprising a mixture of 100 parts by weight of a solid rubbery brominated interpolymer of a major proportion of isobutylene and a minor proportion of isoprene, said interpolymer being brominated to such an extent that it contains combined bromine in an amount from 20 to 80% of that required to saturate all of its olefinic double bonds, from 40 to 80 parts by weight of a phenol-formaldehyde resin, and a volatile solvent for said interpolymer.

8. A composite article comprising a layer including a solid rubbery interpolymer of a major proportion of an isomonoolefin containing 4 to 8 carbon atoms with a minor proportion of a polyolefin containing 4 to 18 carbon atoms and a layer comprising a mixture of a phenol-aldehyde resin and a solid rubbery brominated interpolymer of a major proportion of an isomonoolefin containing 4 to 8 carbon atoms with a minor proportion of a polyolefin containing 4 to 18 carbon atoms, said brominated interpolymer containing a combined bromine content above 0.5% by weight but below that which corresponds to complete saturation of the olefinic double bonds, said layers being adhered together in contacting face-to-face relation.

9. A composite article comprising a layer including a solid rubbery interpolymer of 70 to 99% by weight of an isomonoolefin containing 4 to 8 carbon atoms with 1 to 30% by weight of a polyolefin containing 4 to 18 carbon atoms, a layer of a material normally poorly adherent to the first said layer, and an intermediate layer disposed between the first said two layers, said intermediate layer comprising a mixture of a phenol-formaldehyde resin and a solid rubbery brominated interpolymer of 70 to 99% by weight of an isomonoolefin containing 4 to 8 carbon atoms and 1 to 30% by weight of a polyolefin containing 4 to 18 carbon atoms, said brominated interpolymer containing a combined bromine content above 0.5% by weight but below that which corresponds to complete saturation of the olefinic double bonds, said layers all being adhered together.

10. A composite article comprising a layer including a solid rubbery interpolymer of 70 to 99% by weight of an isomonoolefin containing 4 to 8 carbon atoms and 1 to 30% by weight of a polyolefin containing 4 to 18 carbon atoms bonded to a metal member by an intermediate layer disposed between said layer and said metal member, said intermediate layer comprising a mixture of a phenol-formaldehyde resin and a solid rubbery brominated interpolymer of 70 to 99% by weight of an isomonoolefin containing 4 to 8 carbon atoms and 1 to 30% by weight of a polyolefin containing 4 to 18 carbon atoms, said brominated interpolymer being brominated to such an extent that it contains combined bromine in an amount from 20 to 80% of that required to saturate all of its olefinic double bonds.

11. The method of preparing an adhesive composition which comprises mixing together a phenol-aldehyde resin and a solid rubbery brominated olefinically-unsaturated interpolymer of a major proportion of an isomonoolefin containing 4 to 8 carbon atoms with a minor proportion of a polyolefin containing 4 to 18 carbon atoms, said interpolymer containing a combined bromine content above 0.5% by weight but below that which corresponds to complete saturation of the olefinic double bonds.

12. The method of preparing an adhesive composition which comprises mixing together a phenol-formaldehyde resin, a solid rubbery brominated olefinically-unsaturated interpolymer of 70 to 99% by weight of an isomonoolefin containing 4 to 8 carbon atoms and 1 to 30% by weight of a polyolefin containing 4 to 18 carbon atoms, said interpolymer being brominated to such an extent that it contains combined bromine in an amount from 20 to 80% of that required to saturate all of its olefinic double bonds, and a volatile solvent for said interpolymer.

13. The method of making a composite article comprising interposing a layer comprising a mixture of a phenol-formaldehyde resin and a solid rubbery brominated olefinically-unsaturated interpolymer of a major proportion of an isomonoolefin containing 4 to 8 carbon atoms and a minor proportion of a polyolefin containing 4 to 18 carbon atoms, said brominated interpolymer containing a combined bromine content above 0.5% by weight but below that which corresponds to complete saturation of the olefinic double bonds, between a layer including a solid rubbery interpolymer of a major proportion of an isomonoolefin containing 4 to 8 carbon atoms with a minor proportion of a polyolefin containing 4 to 18 carbon atoms and a layer of material normally poorly adherent to a solid rubbery interpolymer of a major proportion of an isomonoolefin containing 4 to 8 carbon atoms with a minor proportion of a polyolefin containing 4 to 18 carbon atoms, and subjecting the assembly to a vulcanizing temperature to bond said layers together.

References Cited in the file of this patent

UNITED STATES PATENTS

| Number | Name | Date |
|---|---|---|
| 2,142,980 | Huijser et al. | Jan. 3, 1939 |
| 2,170,947 | Habgood et al. | Aug. 29, 1939 |
| 2,181,144 | Morway et al. | Nov. 28, 1939 |
| 2,390,621 | Shoemaker et al. | Dec. 11, 1945 |
| 2,403,200 | Weiss et al. | July 2, 1946 |
| 2,471,905 | Smith | May 31, 1949 |
| 2,522,137 | Schaffer | Sept. 12, 1950 |
| 2,541,550 | Sarbach et al. | Feb. 13, 1951 |
| 2,553,427 | Smith | May 15, 1951 |
| 2,566,329 | Hessney et al. | Sept. 4, 1951 |
| 2,566,384 | Tilton | Sept. 4, 1951 |
| 2,575,249 | Connell et al. | Nov. 13, 1951 |
| 2,631,984 | Crawford et al. | Mar. 17, 1953 |